US012151615B2

(12) United States Patent
Baggi et al.

(10) Patent No.: US 12,151,615 B2
(45) Date of Patent: *Nov. 26, 2024

(54) HOUSING FOR A REAR VIEW ELEMENT OF A REAR VIEW DEVICE FOR A VEHICLE

(71) Applicant: SMR Patents S.à.r.l., Luxembourg (LU)

(72) Inventors: Thomas Baggi, Dammarie-les-Lys (FR); Francis Charlet, Dammarie-les-Lys (FR); David Gaskin, Portchester (GB); Andrew Lettis, Portchester (GB); Benjamin Bruhin, Dammarie-les-Lys (FR); Wilfried Bonny, Dammarie-les-Lys (FR)

(73) Assignee: SMR Patents S.à.r.l., Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 18/522,848

(22) Filed: Nov. 29, 2023

(65) Prior Publication Data
US 2024/0092263 A1    Mar. 21, 2024

Related U.S. Application Data

(63) Continuation of application No. 17/237,619, filed on Apr. 22, 2021, now Pat. No. 11,865,973, which is a (Continued)

(30) Foreign Application Priority Data

Sep. 16, 2016   (DE) .................... 10 2016 117 488.2

(51) Int. Cl.
*B60R 1/06*    (2006.01)

(52) U.S. Cl.
CPC .................................... *B60R 1/06* (2013.01)

(58) Field of Classification Search
CPC .................................. B60R 1/06; B60R 1/04
(Continued)

(56) References Cited

U.S. PATENT DOCUMENTS 4,125,244 A  *  11/1978  Lukey .................... B62J 29/00
                                                       248/478
5,245,480 A       9/1993  Polzer
(Continued)

FOREIGN PATENT DOCUMENTS

EP          1138552 A2     4/2001

OTHER PUBLICATIONS

Examination report dated Apr. 28, 2017 from related DE 10 2016 117 448.2 (not translated).

*Primary Examiner* — Ricky D Shafer
(74) *Attorney, Agent, or Firm* — Jones Day (57) ABSTRACT

A housing for a rear view element of a rear view device for a vehicle includes a scalp portion comprising a first circumferential edge being c-shaped extending at least partially around an opening of the scalp portion, and a bezel comprising a second circumferential edge having a lip portion extending at least partially around the bezel. The c-shaped first circumferential edge of the scalp portion is configured to at least partly overlap the lip portion to obtain a flush surface at a separation edge which is located at least partly at an inside panel of the bezel.

23 Claims, 4 Drawing Sheets

Related U.S. Application Data continuation-in-part of application No. 15/706,029, filed on Sep. 15, 2017, now Pat. No. 10,988,082.

(58) Field of Classification Search
USPC .............................. 359/841, 871, 872, 877
See application file for complete search history.

(56) References Cited

U.S. PATENT DOCUMENTS

| | | | |
|---|---|---|---|
| 5,583,703 A * | 12/1996 | Lang | B60R 1/0612 |
| | | | 359/877 |
| 5,621,577 A * | 4/1997 | Lang | B60R 1/0605 |
| | | | 359/872 |
| 5,687,035 A * | 11/1997 | Lang | H01Q 1/3266 |
| | | | 359/865 |
| 5,760,980 A | 6/1998 | Lang | |
| 6,419,300 B1 | 7/2002 | Pavao et al. | |
| 6,499,850 B2 * | 12/2002 | Waldmann | B60R 1/04 |
| | | | 359/603 |
| 6,712,329 B2 | 3/2004 | Ishigami et al. | |
| 7,614,755 B2 | 11/2009 | Branham | |
| 8,016,437 B2 | 9/2011 | Wakabayashi | |
| 8,568,006 B2 | 10/2013 | Asai | |
| 8,579,444 B2 | 11/2013 | Lettis et al. | |
| 8,727,412 B2 | 5/2014 | Wolf et al. | |
| 8,876,305 B2 * | 11/2014 | Mueller | B60R 1/074 |
| | | | 359/872 |
| 10,988,082 B2 | 4/2021 | Lettis et al. | |
| 11,865,973 B2 * | 1/2024 | Baggi | B60R 1/06 |
| 2001/0028178 A1 | 10/2001 | Mizutani et al. | |
| 2010/0296189 A1 | 11/2010 | Lettis et al. | |
| 2017/0349101 A1 | 12/2017 | Eto | |
| 2018/0134218 A1 * | 5/2018 | Lettis | H04N 23/51 |

\* cited by examiner

HOUSING FOR A REAR VIEW ELEMENT OF A REAR VIEW DEVICE FOR A VEHICLE

CROSS-REFERENCE TO RELATED APPLICATIONS

This application is a continuation of U.S. patent application Ser. No. 17/237,619, filed Apr. 22, 2021, which is a continuation-in-part of U.S. patent application Ser. No. 15/706,029, filed Sep. 15, 2017, which claims the benefit of foreign priority to German Patent Application No. DE 10 2016 117 488.2, filed Sep. 16, 2016, each of which are herein incorporated by reference in their entirety for all purposes.

BACKGROUND

1. Field

The following description relates to a housing for a rear view element of a rear view device for a vehicle, preferably a motor vehicle. The housing may include a scalp portion having a first joint section at a first circumferential edge extending at least partially around an opening of the scalp portion. In addition, the housing may include a bezel portion having a second joint section at a second circumferential edge extending at least partially around the bezel section, where the first joint section of the scalp portion and the second joint section of the bezel portion are connectable to each other at a separation edge.

2. Description of Related Art

In vehicles, rear view elements such as the reflective elements that are employed in rear view devices are used for helping the driver to see areas behind and to the sides of the vehicle. These elements are usually included in housings mounted to a side of the vehicle. The housing has essentially the purpose to hold the rear view element at an adjustable position relative to the vehicle so that the driver of the vehicle can adjust the rear view element to correspond to the driver's seating position to obtain good rearward visibility. Also, the housing helps to protect the rear view device from outside influences, i.e. rain, wind, etc. Furthermore, most housings are aerodynamically shaped to reduce the drag coefficient of the vehicle.

Typically, the housings include several components, or portions, where a bezel portion surrounds and secures the rear view element, a scalp portion, that might be aerodynamically shaped, protects the rear view element from outside influences. Typically, the separation edge, or joint between the bezel portion and the scalp portion is traditionally located within a channel arranged in a circumferential region of the housing. These channels are traditionally employed to minimize wind noise and to collect water droplets. For example, U.S. Pat. No. 8,727,412 B2 describes such a housing, where the bezel portion and the scalp portion are connected at a separation edge located in the channel.

However, arranging the separation edge in such a channel, may cause wind noise due to the high speed around the separation edge. A one piece housing, where the scalp portion and the bezel portion are formed in one component, are sometimes used to make the separation edge redundant. However, manufacturing these one piece housings using an injection molding process results in complex processing and thick walled moldings.

EP Patent Application No. 1 138 552 A2 describes a rearview mirror assembly for a vehicle having a mirror with a rear surface and an outer periphery, and a visor which includes a visor cover for covering the rear surface of the mirror and a visor rim for surrounding the outer periphery of the mirror, the visor rim having an annular end portion. The visor cover has an annular end portion which engages with the annular end portion of the visor rim when the visor cover and the visor rim are assembled to each other, and where the engagement of the visor cover annular end portion and visor rim annular end portion with one another forms a loop-shaped opposing portion between a surrounding wall of the visor cover and a surrounding wall of the visor rim or between a connecting portion integrally formed with a main body of said visor cover and a lid integrally formed with a main body of the visor rim as a boundary between the visor cover and the visor rim. The loop-shaped opposing portion is exposed at the open end of the visor substantially towards the rear of the vehicle.

The following description aims at providing a housing for a rear view device for a vehicle that overcomes the above mentioned problems. In particular, in an aspect, it is an object to further develop the known housing to have a pleasing as well as aerodynamic design and a simple structure.

SUMMARY OF THE INVENTION

The following description solves the above mentioned problems by providing a separation edge that is located at least partly at an inside panel of the bezel portion. In addition, the first joint section comprises at least one clamp, preferably a continuous clamp extending at least partly along the first circumferential edge, and/or the second joint section comprises at least one protrusion, preferably a continuous protrusion extending at least partly along the second circumferential edge. Still further the clamp is adapted to at least partly overlap the protrusion to obtain a flush surface at the separation edge, preferably the clamp is curved at approximately 180° to hold the protrusion.

In the context of this disclosure, the term 'scalp portion' can be used to refer to a scalp, or cover that can be used to cover and/or to shield the various items that could be arranged in the housing of a rear view device. The term 'bezel portion' can be used to refer to a structure that at least partly surrounds the rear view element and holds the rear view element. Also, the term 'opening' can be used to refer to a material-free part of the surface of the bezel portion that houses at least parts of the scalp portion when scalp portion and bezel portion are mounted together. The term 'separation edge' can be used to refer to a connection edge, and/or to a location where scalp portion and bezel portion can be connected.

In one example, the scalp portion includes a first rim that is adapted to complement at least in part a second rim of the bezel portion when the scalp portion and the bezel portion are connected together, preferably wherein in a connected state a resulting rim encircles essentially the circumference of the bezel portion.

Here, the term 'rim encircles essentially the circumference of the bezel portion' can be used to define a resulting closing edge of the connected scalp portion and bezel portion when viewed towards the rear view element. Also, the term 'rim' can be used to refer to the end, and/or to an extension of the inside panel.

In one example, the separation edge is located between the first rim and the inside panel of the bezel portion.

In one example, the clamp is adapted to at least partly overlap the protrusion to obtain a flush surface at the separation edge, preferably the clamp is curved at approximately 180° to hold the protrusion.

In one example, the bezel portion is adapted to surround at least partly the rear view element and/or to secure the rear view element in the housing.

In one example, the scalp portion is adapted to at least partly shield the rear view element.

In one example, the housing includes a foot portion connectable to the vehicle, wherein the foot portion is connectable to the scalp portion and/or to the bezel portion to hold the scalp portion and/or the bezel portion.

In one example, the scalp portion comprising a channel, preferably a water channel, extending on the top side of the scalp portion essentially parallel to the separation edge.

In one example, the scalp portion and/or the bezel portion includes/include plastic material, and is/are produced in an injection molding process.

The invention also relates to a rear view display device for a vehicle, preferably for a motor vehicle, comprising at least one housing according to the invention.

In one example, the rear view display device includes a camera and/or a reflective element, preferably a mirror element.

Also, the invention relates to a vehicle comprising a rear view display device according to the invention.

It has been advantageously found that by locating the separation edge at least partly at an inside panel of the bezel portion, wind noises can be significantly reduced, because the separation edge is located in a low pressure air zone, avoiding the vehicle airflow direction.

Also, the scalp portion and the bezel portion can be cheaply manufactured in two separate parts using an injection molding process.

In addition, it has been found that by using a clamping connection, the first joint section and the second joint section can be quickly and reliably attached to each other.

In another aspect, a housing for a rear view element of a rear view device for a vehicle includes a scalp portion comprising a first circumferential edge being c-shaped extending at least partially around an opening of the scalp portion; a lower casing portion comprising a second circumferential edge being c-shaped extending at least partially around an opening of the lower casing portion; and a bezel comprising a third circumferential edge having a lip portion extending at least partially around the bezel section, where each of the c-shaped edge of the scalp portion and the c-shaped edge of the lower casing portion is adapted to at least partly overlap the lip portion to obtain a flush surface at a separation edge which is located at least partly at an inside panel of the bezel portion.

In another aspect, a method for assembling a housing for a rear view element of a rear view device for a vehicle includes providing the housing including a scalp portion comprising a first circumferential edge being c-shaped extending at least partially around an opening of the scalp portion; a lower casing portion comprising a second circumferential edge being c-shaped extending at least partially around an opening of the lower casing portion; and a bezel comprising a third circumferential edge having a lip portion extending at least partially around the bezel section; and assembling the scalp portion of the housing by contacting the first circumferential edge of the housing with the bezel and rotating the scalp portion towards the lower casing portion, where each of the c-shaped edge of the scalp portion and the c-shaped edge of the lower casing portion is adapted to at least partly overlap the lip portion to obtain a flush surface at a separation edge which is located at least partly at an inside panel of the bezel portion.

In another aspect, a rear view display device for a vehicle, includes a housing for a rear view element including a scalp portion having a first circumferential edge being c-shaped extending at least partially around an opening of the scalp portion; a lower casing portion comprising a second circumferential edge being c-shaped extending at least partially around an opening of the lower casing portion; and a bezel having a third circumferential edge having a lip portion extending at least partially around the bezel section, where each of the c-shaped edge of the scalp portion and the c-shaped edge of the lower casing portion is adapted to at least partly overlap the lip portion to obtain a flush surface at a separation edge which is located at least partly at an inside panel of the bezel portion.

In another aspect, a vehicle may include the rear view display device.

BRIEF DESCRIPTION OF THE DRAWINGS

The following drawings show aspects of the invention for improving the understanding of the invention in connection with some exemplary illustrations.

DETAILED DESCRIPTION

Figure 1:
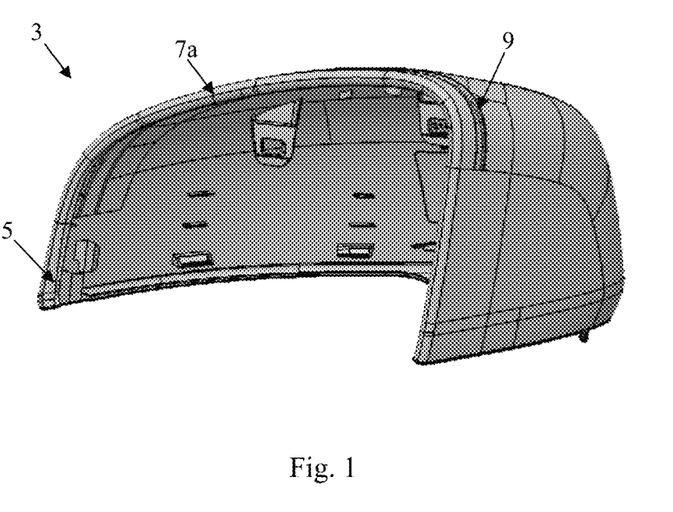
FIG. 1 is a diagram illustrating a schematic view of a scalp portion according to an embodiment of the invention.

A scalp portion 3 according to an embodiment of the invention is shown in FIG. 1. From FIG. 1 it can be seen that the scalp portion 3 has a three-dimensional shape with an opening, or cavity to cover various elements that might be included in a rear view device. Also, as shown in the figure, the scalp portion 3 can include further attachment points, e.g. lugs and/or recesses, for securing the scalp portion to further parts of a housing such as bezel and foot portions (not shown in FIG. 1).

A first joint section 5 at a first circumferential edge of the scalp portion 3 that runs partly around the opening of the scalp portion 3 is also shown in FIG. 1. In the shown embodiment, the first joint section 5 is only arranged at the opening in the vertical plane where the scalp portion 3 will be arranged partly around the bezel portion when the housing is fully assembled. However, the skilled person would know that the first joint section 5 could be also arranged around the entire opening of the scalp portion 3 to completely encircle the opening. In the later case, the foot portion would include a complementary geometry to connect to the first joint section 5.

FIG. 1 also shows a first rim 7a that extends along and/or, as shown in FIG. 1, on top of the first joint section 5. As it can be seen from FIG. 1, a channel 9 is arranged in the material of the scalp portion 3. In the shown embodiment, the channel 9 runs essentially in part parallel to the first circumferential edge of the scalp portion 3. However, the skilled person would know that the channel 9 could be also arranged differently in the material of the scalp portion 3. Also, the skilled person would know that more than one channel 9 could be used, or that no channel is arranged in the material of the scalp portion 3.

Figure 2:
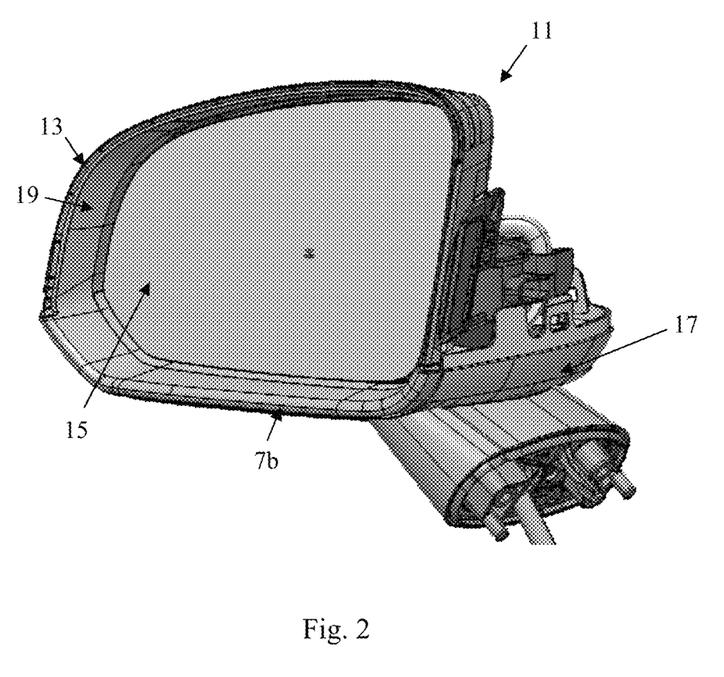
FIG. 2 is a diagram illustrating a schematic view of a bezel portion together with a rear view element and a foot portion according to an embodiment of the invention.

FIG. 2 shows a schematic view of a bezel portion 11 together with a rear view element 15 and a foot portion 17 according to an embodiment of the invention. As it can be seen from FIG. 2, the bezel portion 11 is a ring like structure and fastens the rear view element 15 which is shown as a reflective element in FIG. 2. However, the skilled person would know that the bezel portion 11 could be also differently shaped to fasten a different rear view element, for example a camera, or a combination of reflective element and camera. In the shown embodiment, the bezel portion 11 includes a second joint section 13 that runs partially around its circumference. From FIG. 2 it can be seen that a second rim 7b is disposed on the lower part of the circumference, while the second joint section 13 is disposed on the upper part of the circumference. Here, the terms 'upper' and 'lower' refer to the orientation of the bezel portion 11 as shown in the figure which essentially corresponds to the mounting position of the assembled housing on the vehicle.

The bezel portion 11 also includes an inside panel 19 that extends from the second joint section 13 and/or the second circumferential ring 7b to the rear view element 15. The inside panel 19 has the shape of an extruded surface in a direction essentially perpendicular to the circumference of the rear view element 15.

FIG. 2 shows that the bezel portion 11 and the rear view element 15 are both arranged on a foot portion 17, which can be mounted to the side of a vehicle. However, the skilled person would know that the foot portion could 17 could be also shaped differently to attach the assembled housing to various parts of the vehicle. Also, in one embodiment that is not shown in the figures, the scalp portion could include means that can be used to attach the housing directly to a suitable part of the vehicle.

Figure 3:
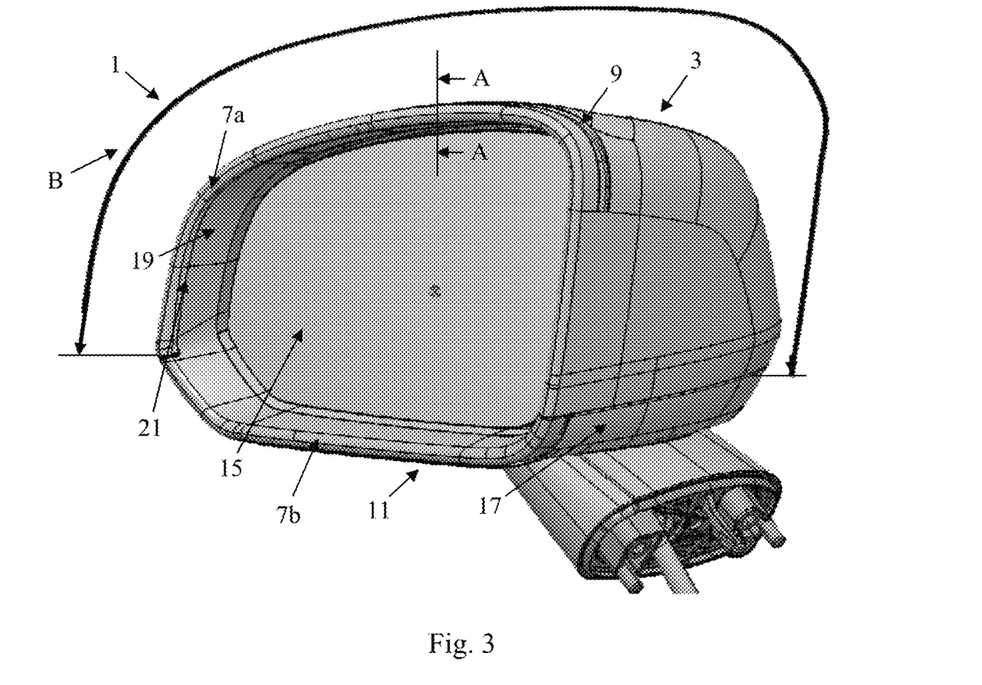
FIG. 3 is a diagram illustrating a schematic view of an assembled housing according to an embodiment of the invention.

FIG. 3 shows a schematic view of an assembled housing 1 according to an embodiment of the invention. The assembled housing 1 that is shown could include the components that are shown in FIGS. 1 and 2. As it can be seen from the figure, the first joint section and the second joint section are connected together at a separation edge 21 that is located between the first rim 7a of the scalp portion 3 and the inside panel 19 of the bezel portion 11. It is also shown that the first rim 7a and the second rim 7b merge into one rim that encircles the circumference of the rear view element 15. The first joint section and the second joint section connect to obtain an essentially flush surface.

Figure 4:
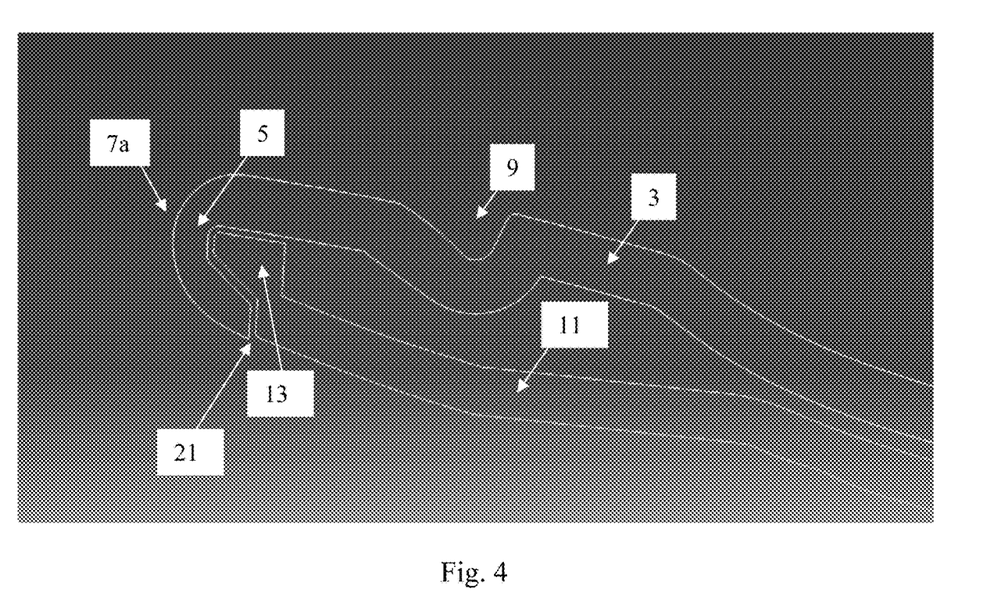
FIG. 4 is a diagram illustrating a cross-sectional view of the scalp portion and the bezel portion when mounted together according to an embodiment of the invention.

The arrows denoted 'A' mark the location of the cross-sectional view that is shown in FIG. 4, and the arrow denoted 'B' shows the pathway of section A-A around the scalp 3 and bezel 11 portion.

FIG. 4 shows the cross-sectional view A-A as indicated in FIG. 3 of the scalp portion 3 and the bezel portion 11 when mounted together according to an embodiment of the invention. As it can be seen from the figure, the first joint section 5 includes in the shown embodiment a continuous clamp extending along the pathway B that is shown in FIG. 3, and the second joint section 13 includes a continuous protrusion extending along the pathway B that is also shown in FIG. 3. Here, in the shown embodiment the continuous clamp overlaps the protrusion to obtain a flush surface at the separation edge 21. Also, in FIG. 4 it is shown that the rim 7a is formed on the scalp portion 3 by the outside curvature of the clamp. However, the skilled person would know that the scalp portion 3 and the bezel portion 11 could be mounted together in a different manner, for example, by using a different clamping connection.

FIGS. 5A, 5B, 5C, and 5D are diagrams illustrating schematic views of rotational assembly of a housing 100 according to another embodiment of the invention.

Figure 5A:
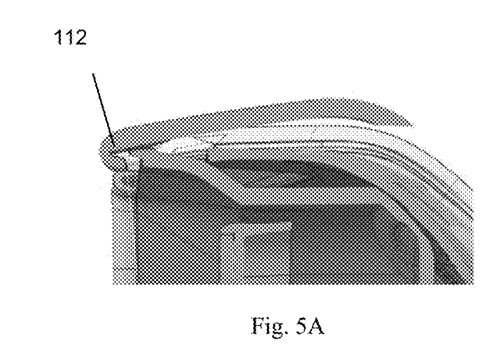
FIGS. 5A, 5B, 5C, and 5D are diagrams illustrating schematic views of rotational assembly of a housing according to another embodiment of the invention.
Figure 5B:
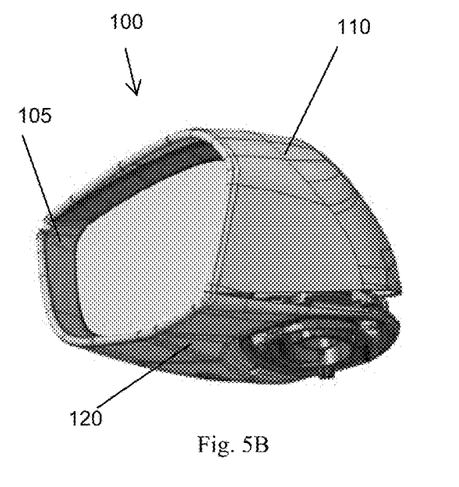

Referring to FIGS. 5A and 5B, the housing 100 is illustrated in a pre-assembled position—that is, just before it is fully assembled and with the scalp portion 110 being configured for assembly by rotating over the housing 100. Specifically, as shown in FIG. 5A, the scalp 110 has a c-section 112 that is the initial point of interaction with the bezel 105 of the housing 100 during assembly; subsequently, the scalp portion 110 is rotated towards the lower casing 120. By this assembly method, translation of the scalp portion 110 is largely avoided and instead the scalp portion 110 will rotate over the mirror housing 100.

Figure 5C:
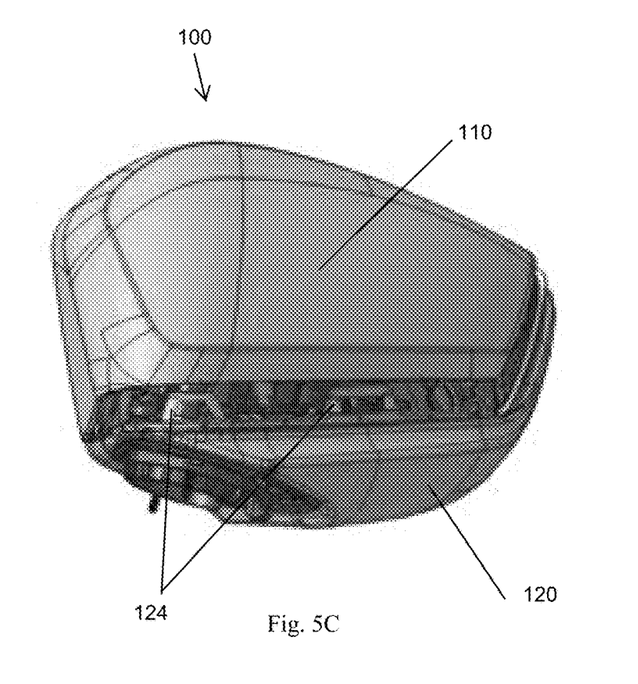
Figure 5D:
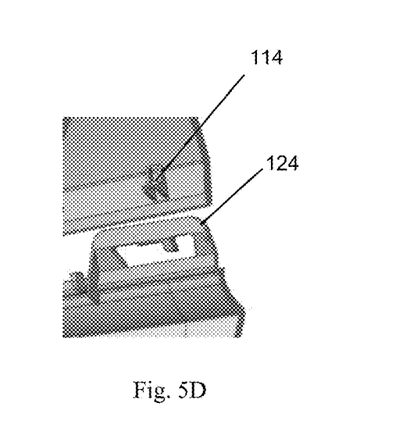

Referring now to FIGS. 5C and 5D, once the rear clips 114 of the scalp portion 110 reach the clip openings 124 of the lower casing portion 120, the clips 114 engage the clip openings 124 and the scalp portion 110 is securely attached so that the assembly of the housing 100 is complete.

Figure 6:
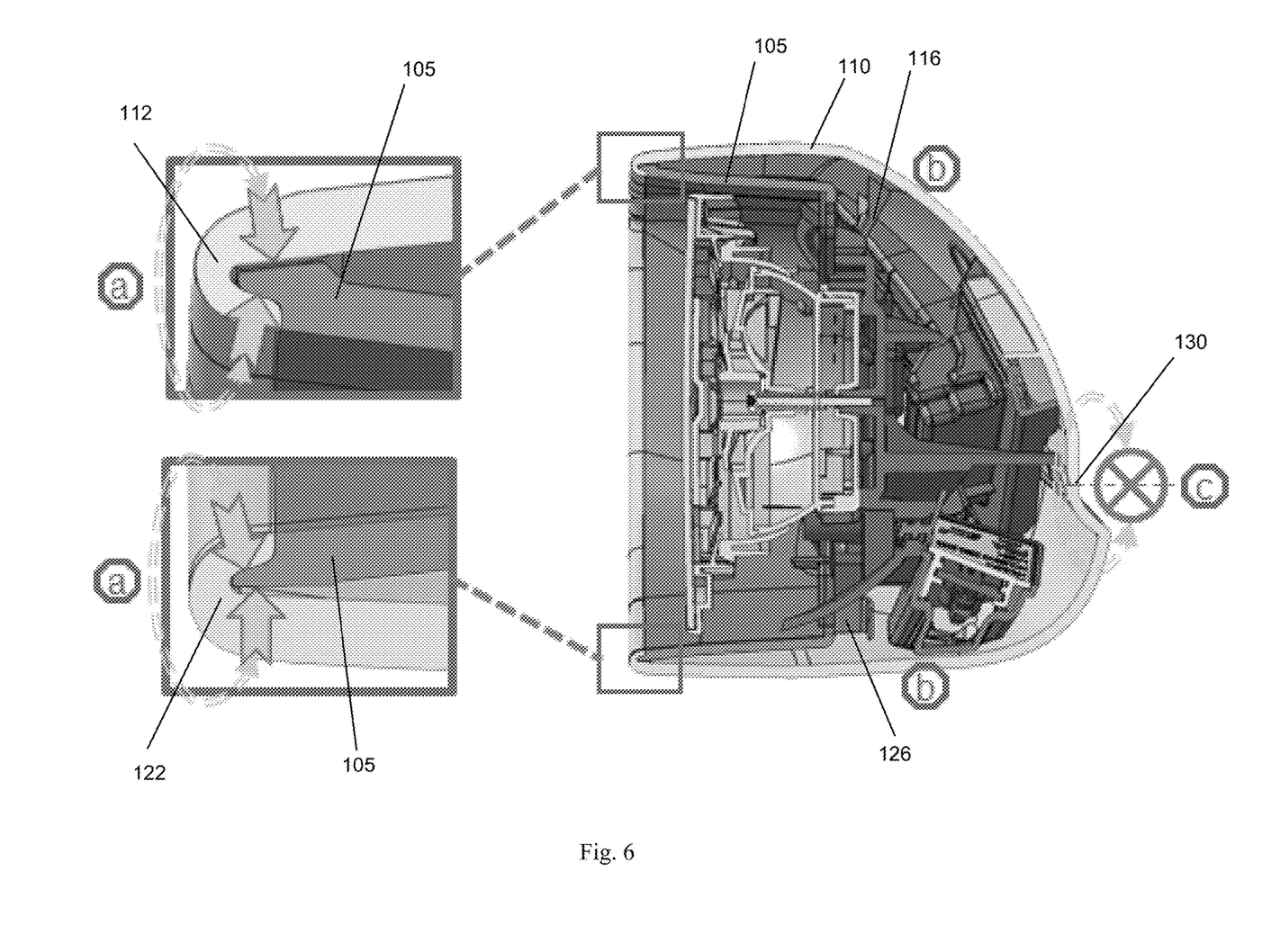
FIG. 6 is a diagram illustrating the housing of FIGS. 5A-5D including a cross-sectional view and two magnified views of the assembled housing.

FIG. 6 is a diagram illustrating the housing of FIGS. 5A-5D including a cross-sectional view and two magnified views of the assembled housing.

Referring to FIG. 6, the two magnified views illustrate the interaction between the c-section 112 of the scalp portion 110 of the housing 100 and the lip portion of the bezel 105 of the housing (which is already described above in reference to FIGS. 5A-5D). The other magnified view illustrates a similar attachment between a c-section 122 of the lower casing portion 120 and another lip portion of the bezel 105.

Further, as the scalp portion 110 is rotated and being assembled, a rib 116 of the scalp portion slips on the bezel 105 to make a contact point that hold the bezel lip in position within the c-section 112 of the scalp portion 110. This avoids the disengagement of the scalp portion 110 when a horizontal effort is applied. This is illustrated at one of two contact points B Similarly, at the other contact point B, a rib 126 of the lower casing 120 engages with the bezel 105 to make a contact point that hold the bezel lip in position within the c-section 122 of the lower casing portion 120. Finally, a third contact point C illustrates the clip interaction 130 of the rear clips 114 of the scalp portion 110 with the clip openings 124 of the lower casing portion 120, as already described above in references with FIGS. 5C and 5D. This clip interaction 130 avoids any reverse movement (rotation) that would dissociate the scalp portion 110 from the mirror head. Its retention works in a vertical direction. As a result, the contact points at (B) are each directly opposed to the lip-in-c-shape-assembly (and act in a horizontal direction), while the clip interaction at (C) has a perpendicular action to keep the whole assembly in place.

Accordingly, at least some benefits of the assembly of the housing 100 include, but are not limited to: (A) the fittings between the parts are outside the wind path to avoid wind noise; (B) the flushness of the parts is achieved easily due to the c-sections 112, 122; (C) the contacts points B as result of the ribs 116, 126 hold the lip in the c-sections 112, 122; and (D) the clipping interaction 130 is done in a perpendicular direction which counteracts perpendicular force without affecting the attachments at the c-sections 112, 126. Additional benefits and advantages for this arrangement should also be apparent to those of skill in the art.

The features disclosed in the claims, the specification, and the drawings maybe essential for different embodiments of the claimed invention, both separately or in any combination with each other.

REFERENCE SIGNS

1 housing
3 scalp portion
5 first joint section
7a first rim
7b second rim
9 channel
11 bezel portion
13 second joint section
15 rear view element
17 foot portion
19 inside panel
21 separation edge
100 housing
105 bezel portion
110 scalp portion
112 c-section of scalp portion
114 rear clips of scalp portion
116 rib of scalp portion
120 lower casing portion
122 c-section of lower casing portion
124 clip opening of lower casing portion
126 rib of lower casing portion
130 clip interaction
A section
B pathway of section A-A around scalp portion

What is claimed is:

1. A housing for a rear view element of a rear view device for a vehicle, comprising:
    a scalp portion comprising a first circumferential edge, the first circumferential edge being a c-shaped inner edge of the scalp portion that extends at least partially around an opening of the scalp portion; and
    a bezel comprising a second circumferential edge having a lip portion extending at least partially around a circumference of the bezel,
    wherein the c-shaped first circumferential edge of the scalp portion is configured to at least partly overlap the lip portion to obtain a flush surface at a separation edge which is located at least partly at an inside panel of the bezel, and
    wherein the c-shaped first circumferential edge is curved at an obtuse angle to hold the lip portion of the bezel.

2. The housing of claim 1, wherein the first circumferential edge extends continuously around the opening of the scalp portion to provide a continuous clamping connection with the second circumferential edge of the bezel.

3. The housing of claim 1, wherein the scalp portion further comprises at least one rib which is configured to engage a rear part of the bezel at a position opposite a clamping connection formed by the c-shaped first circumferential edge of the scalp portion and the lip portion of the bezel so that a horizontal counter-movement that would dissociate the clamping connection is avoided.

4. The housing of claim 1, wherein the bezel is configured to at least partly surround the rear view element.

5. The housing of claim 1, wherein the bezel is configure to secure the rear view element in the housing.

6. The housing of claim 1, wherein the scalp portion is adapted to at least partly shield the rear view element.

7. The housing of claim 1, wherein at least one of the scalp portion or the bezel comprises plastic material and is produced in an injection molding process.

8. The housing of claim 1, wherein a clamping connection formed between the first circumferential edge of the scalp portion and the second circumferential edge of the bezel is configured to reduce wind noise of the housing.

9. The housing of claim 1, wherein the obtuse angle is approximately 180°.

10. A method for assembling a housing for a rear view element of a rear view device for a vehicle, comprising:
    providing the housing, comprising:
        a scalp portion comprising a first circumferential edge, the first circumferential edge being a c-shaped inner edge of the scalp portion that extends at least partially around an opening of the scalp portion, and
        a bezel comprising a second circumferential edge having a lip portion extending at least partially around a circumference of the bezel; and
    assembling the scalp portion of the housing by contacting the first circumferential edge of the housing with the second circumferential edge of the bezel and rotating the scalp portion,
    wherein the c-shaped first circumferential edge of the scalp portion is configured to at least partly overlap the lip portion to obtain a flush surface at a separation edge which is located at least partly at an inside panel of the bezel, and
    wherein the c-shaped first circumferential edge is curved at an obtuse angle to hold the lip portion of the bezel.

11. The method of claim 10, wherein the first circumferential edge extends continuously around the opening of the scalp portion to provide a continuous clamping connection with the second circumferential edge of the bezel.

12. The method of claim 10, wherein the scalp portion further comprises at least one rib which is configured to engage a rear part of the bezel at a position opposite a clamping connection formed by the c-shaped first circumferential edge of the scalp portion and the lip portion of the bezel so that a horizontal counter-movement that would dissociate the clamping connection is avoided.

13. The method of claim 10, wherein the bezel is configured to at least partly surround the rear view element.

14. The method of claim 10, wherein the bezel is configure to secure the rear view element in the housing.

15. The method of claim 10, wherein the scalp portion is adapted to at least partly shield the rear view element.

16. The method of claim 10, wherein at least one of the scalp portion or the bezel comprises plastic material and is produced in an injection molding process.

17. The method of claim 10, wherein a clamping connection formed between the first circumferential edge of the scalp portion and the second circumferential edge of the bezel is configured to reduce wind noise of the housing.

18. The method of claim 10, wherein the obtuse angle is approximately 180°.

19. A rear view display device for a vehicle, comprising:
    a housing for a rear view element, comprising:
        a scalp portion comprising a first circumferential edge, the first circumferential edge being a c-shaped inner edge of the scalp portion that extends at least partially around an opening of the scalp portion; and
        a bezel comprising a second circumferential edge having a lip portion extending at least partially around a circumference of the bezel, wherein the c-shaped first circumferential edge of the scalp portion is configured to at least partly overlap the lip portion to obtain a flush surface at a separation edge which is located at least partly at an inside panel of the bezel, wherein the c-shaped first circumferential edge is curved at an obtuse angle to hold the lip portion of the bezel.

20. The rear view display device of claim 19, wherein the first circumferential edge extends continuously around the opening of the scalp portion to provide a continuous clamping connection with the second circumferential edge of the bezel.

21. The rear view display device of claim 19, comprising a rear view element comprising at least one of a camera or a reflective element.

22. A vehicle, comprising the rear view display device according to claim 19.

23. The rear view display device of claim 19, wherein the obtuse angle is approximately 180°.

* * * * *